3,224,992
WATER SOLUBLE COMPOSITIONS SUITABLE FOR BAKED FILMS
James R. Stephens, Gary, Ind., assignor to Standard Oil Company, Chicago, Ill., a corporation of Indiana
No Drawing. Filed Sept. 12, 1961, Ser. No. 137,518
16 Claims. (Cl. 260—29.6)

This invention relates to compositions including water and a resin film-former suitable for the formation of heat cured surface coating films; more particularly, where the principal film-forming resin has been prepared from a benzene tricarboxylic acid such as trimellitic anhydride.

In the recent past, new resin film formers which are soluble in water have been provided to the baked surface coating film art. These film-forming resins are polyester resins which are typically prepared from trimellitic anhydride and alkylene glycol and adipic acid. These polyester resins are easily converted to water soluble forms and are soluble in water to a substantial degree. These water solutions may be used as such to prepare varnish films or they may be pigmented to produce enamel films; that is, surface coating films after the wet film has been baked (heat cured) at about 400° F. for about 30 minutes. These baked films are very tough and have other desirable properties. However, these films tend to show craters. The craters, sometimes known as pinholes, are unsightly surface defects that appear to the eye as small round holes or depressions or crater-like depressions; i.e., a depression having a ridge-like lip extending above the plane of the film.

Many attempts have been made to overcome the crater formation tendencies of the above benzene tricarboxylic acid polyester resins. In general, attempts to modify the chemical nature of the polyester resin have not been entirely successful. Now it has been discovered that a composition suitable for the formation of a heat cured surface coating film, which film is virtually free of cratering tendency, is obtained by admixing with the water soluble polyester resin, a water soluble anticratering agent which agent is poly-N-vinyl-5-methyl-2-oxazolidinone.

THE POLYESTER RESIN

The acidic member reactant in the preparation of the polyester resin (polycondensation reaction product) is an unsubstituted benzene tricarboxylic acid or of the corresponding anhydride; these are trimellitic acid, trimellitic anhydride, hemimellitic acid, hemimellitic anhydride, and trimesic acid.

The water soluble resin portion of the composition consists essentially of the polycondensation reaction product (polyester resin) of one of the above defined acidic members with a hereinafter defined dihydroxyl affording material having only carbon, hydrogen and oxygen atoms, such as an alkylene glycol having 2–10 carbon atoms (and an alkanedioic acid having 4–10 carbon atoms). The acidic member, the dihydroxyl material, and the alkanedioic acid, when used, may be charged to the polycondensation reaction in a number of molar ratios. The molar ratio of "acidic member/dihydroxyl/alkanedioic acid" charged falls in the range of 2.3–3.5/7/0.0–3.0; the carboxyl group affording reactants charged and the hydroxyl group affording reactants charged are controlled to provide a molar ratio of "hydroxyl groups/carboxyl groups" within the range of 1.05 to 1.50. In other words, there is present in the reaction zone an excess of hydroxyl groups of roughly about 5–50%. The polycondensation reaction is continued until a product is obtained which is characterized by an acid number of about 25–80. (Acid number herein means the milligrams of KOH used per gram of polyester.)

The defined acid(s) is(are) reacted in a polyesterification-condensation reaction with a material affording two hydroxyl groups per molecule and containing only carbon, hydrogen and oxygen atoms. This dihydroxyl group affording material may provide two hydroxyl groups per molecule as an average for the molecules in a mixed material. When this material is an alcoholysis product, there may be on the average somewhat more than two hydroxyl groups per molecule. This material, in effect, functions as a dihydric alcohol.

The dihydroxyl group affording material may be an ester of a polyethenoid fatty acid containing at least about 10 carbon atoms and a polyhydric paraffinic alcohol (alkane polyol) containing 3 or more hydroxyl groups. The polyhydric alcohols include glycerol, erythritol, pentaerythritol, threitol, dipentaerythritol, and trimethylol propane. The polyethenoid fatty acid contains at least two olefinic bonds and contains at least about 10 carbon atoms. The drying fatty acids containing 16–24 carbon atoms are particularly suitable. Illustrative drying fatty acids are: linoleic, hiragonic, eleostearic, moroctic, arachidonic, elupanodonic, and nisinic. Economical and preferred sources of acids are the natural mixtures of acids obtained from drying fatty oils such as linseed oil, soya oil, tung oil, etc.

The non-drying fatty acids containing at least about 10 carbon atoms may be used to form this dihydroxyl affording ester. Illustrations of such acids are: capric, n-undecylic, lauric, myristic, palmitic, margaric, stearic, behenic and mellissic.

When the defined polyol is glycerol, the ester charged to the reaction zone is properly termed a monoglyceride of the particular fatty acid. For convenience, the terminology monoglyceride is utilized to describe this ester even when the polyol utilized in the formation of the ester is some other three or four hydroxyl group containing polyol.

Instead of more or less pure monoglyceride, the dihydroxyl group affording material may be the alcoholysis product of the hereinabove defined polyol and a fat. When the polyol used in the alcoholysis reaction is glycerol, then the alcoholysis product will include the monoglyceride of all the fatty acids contained in the fat and also the non-reactive materials. When the reacting polyol is other than glycerol, the alcoholysis product will include a mixture of true glycerides and glyceride type esters of the various acids and the reacting polyol. Sufficient reacting polyol is utilized in the alcoholysis reaction to have in the alcoholysis product compounds affording on the average two hydroxyl groups per molecule.

Any of the drying oils containing polyethenoid fatty acid esters, whether of vegetable or marine life origin, may be utilized. Illustrative of these drying oils are: linseed, soybean, tung, castor, dehydrated castor, oiticia, perilla, safflower, menhaden, and sardine.

When special properties are desired, the dihydroxyl group affording material may be a mixture of one or more of the various monoglycerides or a mixture of monoglyceride with an alcoholysis product or a mixture of alcoholysis product from two or more fatty oils, etc.

The alkylene glycols are a preferred dihydroxyl material; these may be either simple glycols or ether glycols which have from 2 to 10 carbon atoms. Illustrations of these alkylene glycols are ethylene glycol, propylene glycol, 1,4-butanediol, neopentyl glycol, 1,3-hexanediol, diethylene glycol, dipropylene glycol, triethylene glycol, tetraethylene glycol and decanediol. Usually, the glycols having 4–10 carbon atoms are used. Especially good results are obtained with the butanediols and pentanediols, such as 1,4-butanediol and neopentyl glycol.

The polyester preferably includes an alkanedioic acid having 4–10 carbon atoms. It is preferred to use the acids containing 6–7 carbon atoms. Illustrative alkanedioic acids are succinic, glutaric, adipic, pimelic, suberic, azelaic, and sebacic. It is to be understood that the anhydrides of these acids may also be utilized.

For some purposes, it is desirable to modify the straight acidic member-glycol (alkanedioic acid) polyester resin by introducing into the reaction a modifier which may be either an alkane monocarboxylic acid having 6–13 carbon atoms or an alkane monohydric alcohol having 4–13 carbon atoms. The alkane monocarboxylic acids and alkane monohydric alcohols contain only carbon, hydrogen, and oxygen atoms. Illustrative of these alkane monocarboxylic acids are caproic, enanthic, caprylic, pelargonic, capric, n-undecylic, lauric and tridecanoic. Illustrative of these alkane monohydric alcohols are butyl, amyl, caproyl, capryl, undecyl, and lauryl. Particularly suitable of these alcohol modifiers are mixtures obtained by the Oxo process; commercially available Oxo alcohols are isooctyl alcohol, nonyl alcohol, decyl alcohol, and tridecyl alcohol.

The reactants in the preparation of the polyester are charged in molar amounts such that an excess of hydroxyl groups is present in the polycondensation reaction zone. The molar ratio "hydroxyl groups/carboxyl groups" provided by the hydroxyl group affording reactants and the carboxyl group affording reactants is controlled within the range of 1.05/1 to 1.50/1. The amount of excess hydroxyl groups will be determined in each instance by the requirements of the particular polyester.

For convenience in setting forth the proportional molar amounts of the essential reactants, the glycol (dihydroxyl) reactant has been held at seven (7). The desired polyester resin is obtainable while varying the proportional molar amount of the defined acidic member over the range of about 2.3 to 3.5. The alkanedioic acid molar proportion is varied over the range of 0.0 (zero) to 3.0. In order to obtain the desired polyester resin, the proportional molar amounts within the reaction system of "acidic member/dihydroxyl/alkanedioic acid" is held in the range of 2.3–3.5/7/0.0–3.0. When one or more modifiers are present, commonly the alkanedioic acid amount or the acidic member amount is adjusted, within the above ranges, to provide proportional amounts of reactants giving an excess of hydroxyl groups falling within the hereinabove defined range.

It is preferred to produce the polyester resin by the polycondensation reaction of the hereinabove defined acidic member, alyklene glycol and alkanedioic acid, as such, or in combination with the hereinabove defined acid or alcohol modifiers. With these reactants it is preferred to charge the three essential reactants in molar proportions "acid member/glycol/alkanedioic acid" of 2.3–3.2/7/0.5–3.0 with the "hydroxyl group/carboxyl group" ratio controlled in the range 1.05–1.50/1 and the polyester resin acid number being about 25–80 and preferably 30–50.

The acidic member and the defined dihydroxyl material (and the alkanedioic acid) are reacted under the well-known polycondensation reaction conditions. In general, the polycondensation reaction is carried out at a temperature between about 200° F. and about 450° F., and more usually about 300° F.– 350° F. The reaction is carried out under an inert atmosphere, with continuous removal of water of reaction and for the time needed to obtain the desired acid number. When operating with the anhydrides at the lower acid number products, it is desirable to observe the reacting mixture has a tendency to reach the gel point in a more or less abrupt fashion. However, observation of the reaction zone permits ready completion of the reaction without gelation.

The polycondensation reaction is continued until the product has an acid number between about 25–80; more usually this acid number is about 30–50. Polyester resins having this acid number produce superior backed finishes, and are readily converted to the water soluble forms.

FORMATION OF THE WATER SOLUBLE POLYESTER RESIN

The water soluble material contains polyester resin (polycondensation product), as hereinabove described, reacted with an alkaline reacting agent to obtain a water soluble material. The polyester resin and the alkaline agent are reacted until a water soluble form is obtained. Usually enough alkaline agent is used to neutralize the acidity of the polyester resin; less may be used. The amount of alkaline reacting material is most readily determined by following the pH of the aqueous medium. The polyester resin passes into solution substantially completely at pH of about 5. In practically all instances, the polyester will be in a complete solution at a pH of about 6. The use of alkaline agent in excess of that needed to bring all the polyester into solution is not harmful at least up to a water solution pH of about 8. It is preferred to have the aqueous solution somewhat on the acid side or neutral, i.e. a pH of from 6 to 7.

The alkaline reacting agent may be ammonia or alkyl amine, or heterocyclicamine or an alkanolamine. Ammonium hydroxide as the aqueous solution containing 20–28% is suitable. The alkyl amines, particularly the lower molecular weight amines containing not more than 4 carbon atoms in each alkyl group, are especially suitable. The alkanolamines, such as 2-amino-2-methyl-1-propanol, ethanolamine and dimethylethanolamine, are preferred. The heterocyclicamines, such as morpholine, pyridine, and piperidine may be used. The type of alkaline reacting material used is determined in part by the characteristics desired in the final water soluble polyester resin; also, by the type of polyester resin which is to be converted to a water soluble form.

The solubilization reaction is carried out by agitation the polyester resin and the aqueous alkaline reacting medium. It is preferred that it be warm, i.e. maintained in the region of 100–160° F. The two are agitated until the polyester resin has passed into solution. The water solutions of the water soluble polyester resin are clear liquids usually containing some opalescent appearance; the solutions may be colorless or colored, depending on the particular water soluble polyester resin present.

THE ANTI-CRATERING AGENT

The composition of the invention includes a water soluble anti-cratering agent. This agent is the compound poly - N-vinyl-5-methyl-2-oxazolidinone, hereinafter referred to as PVMO. This agent is available as Devlex 130.

OTHER RESINS WHICH MAY BE PRESENT

The hereinbefore defined polyester resin is the principal film-former present in the composition of the invention. Other resin film-formers which are soluble in the composition may also be present; as required, for some particular application. Special applications may involve the use of water soluble or water solubilizing resins based upon melamine and melamine-type materials. These compounds are used in the form of their reaction products with formaldehyde or acetaldehyde. The melamine base may be melamine itself or one of the guanamines; for example, guanamines include formoguanamine, benzoguanamine, acetoguanamine, stearoguanamine and adipodiguanamine.

In addition to the melamine-formaldehyde resins themselves, the various alkylated derivatives of these may be used. The polymethyl ethers of methylol melamine and methylol benzoguanamine are particularly useful. Also, the derivatives where the alkylating material provided from 2 to about 13 carbon atoms are of utility in particular applications.

An outstanding composition is obtained with hexakis-(methoxymethyl)melamine when the compound is essentially 100 percent alkylated. Outstanding results are obtained with tetrakis(alkoxymethyl)benzoguanamine wherein the alkoxy group has 1–3 carbon atoms—and particularly so when alkoxy groups having a different number of carbon atoms are present in the molecule.

In general, when the hereinabove defined melamine-aldehyde resins are present in the composition of the invention, the hereinbefore defined polyester resin is present as at least about 50 weight percent of the resin solids (excluding the PVMO). More usually, the polyester resin forms 70–80 weight percent of the resin solids present in the composition.

It is to be understood that the above statements do not limit the type of other resin solids which can be present in the composition of the invention or the amount thereof. The essential feature of the composition is the tendency to form objectional amounts of craters in the baked film, when the defined anti-cratering agent is not present.

THE PROPORTIONS

In general, the amount of anti-cratering agent needed in the composition is related to the total resin solids present therein rather than solely to the amount of polyester resin present. The proportions of "resin:anti-cratering agent" needed to make 100 parts by weight are in the range of about 98:2 to about 75:25. Usually there is little or no incentive for utilizing a composition containing the resin and the anti-cratering agent in a proportion greater than 90:10; and usually the proportion will be within the range of 98:2 to 95:5—this latter particularly when using a polyester including an alkanedioic acid reactant.

PREPARATION OF THE COMPOSITION

In general, the composition is prepared by forming the water solution of the polyester resin. The anti-cratering agent may be added to the clear water solution or it may be added to a pigmented water solution. The clear solution of polyester resin (other resins) and anti-cratering agent may be used to form clear baked varnish-like finishes. The coloring of the films ranges from water-white clarity to an opaque-brown coloring; the coloring is dependent upon the resin present in the composition. Enamel finishes may be obtained by adding pigments, extenders, dyes and the like to the clear compositions.

Surface coatings may be applied to any material which can stand the necessary curing temperature and time for the particular composition. Compositions which include only the hereinbefore defined polyester resin require curing temperatures of at least about 400° F. and curing times of at least about 30 minutes. The presence of the aforementioned melamine-aldehyde resins, and especially the lower alkylated melamine formaldehyde or benzoguanamine formaldehyde materials, reduces the necessary heat curing temperature or, conversely, the time. In general, temperatures as low as 250–300° F. can be utilized with the compositions containing melamine-type derivatives in addition to the polyester resins. It is to be understood that the invention goes to heat-curable film-forming materials, and is not directed to compositions providing baked films at any particular elevated temperature or for a particular time at a given temperature.

Examples

A resin was prepared by introducing the reactants into a glass flask provided with a propeller stirrer, thermometer, a sparge tube for introducing nitrogen and a condenser for removal of water produced in the polycondensation reaction. The reaction was continued at gradually increasing temperature and was held at about 400° F. until the product material in the flask had an acid number of about 50. This resin was a translucent light-tan colored solid at room temperature of about 75° F.

Water solutions were prepared from each of the polyester resins. These solutions were prepared by adding the resin solid to water at about 140° F. which water contained N,N-dimethyl-2-aminoethanol as the solubilizing agent. The final aqueous solution of the water soluble form of the polyester resin had a pH of about 7.5.

For this resin the molar proportional charge to the vessel was trimellitic anhydride 2.63 moles, neopentyl glycol 7 moles, and adipic acid 1.75 moles or in round numbers 3/8/2. The hydroxyl group/carboxyl group ratio being 1.23.

For tests of enamel coatings, a water solution of the polyester resin was pigmented with rutile titanium dioxide to a level of 9 parts of titanium dioxide per 8 parts of resin by weight, before addition of other resins and of the PVMO.

The PVMO was added to the pigmented aqueous solution of resin as a 30% solution in water. In all examples, the amount of PVMO is shown as a weight percent of total resin solids present, i.e. PVMO plus polyester resin plus any other resin present.

Hexakis(methoxymethyl)melamine was added to the pigmented water solution in an amount sufficient to produce film-former resins consisting of 20 weight percent of the melamine and 80 weight percent of resin. Formulations were prepared by adding PVMO in amounts ranging from 1.0 to 5.0 weight percent based on total resin solids. Tin strips were coated with the various compositions; the coated strips were exposed to ordinary temperatures in air for 15 minutes and then cured in an oven for 30 minutes at 300° F. The cured films were about 1 mil in thickness in all of the strips. All of the strips (both base and PVMO containing formulations) gave an impact test of 80+ inch pounds and did not show any cracks when bent toward a ⅛" mandrel. The panels prepared from the formulation which contained no PVMO showed severe cratering. The panels prepared from the PVMO containing formulations showed some cratering at the 1% level and very slight cratering at the 2% level. At the 3, 4 and 5% levels the films show no cratering. All the PVMO cratering films were the equal of the base in resistance quality of the film and the gloss thereof.

Thus having described the invention, what is claimed is:

1. A composition suitable for the formation of a heat-cured surface coating film, which composition comprises:
   (A) dissolved heat curable resin consisting essentially of a polyester resin which is the polycondensation reaction product of (a) an acidic member selected from the class consisting of trimellitic acid, trimellitic anhydride, hemimellitic acid, hemimellitic anhydride and trimesic acid, (b) a dihydroxyl affording material having only carbon, hydrogen and oxygen atoms, and (c) an alkanedioic acid having 4–10 carbon atoms, the reaction system containing acidic member/dihydroxyl/alkanedioic acid in molar ratio in the range of 2.3-3.5/7/0.0-3.0, the hydroxyl group affording reactants and carboxyl group affording reactants being controlled to provide a molar ratio hydroxyl groups/carboxyl groups charged to the reaction in the range of 1.05–1.50, and said polyester being characterized by an acid number of about 25–80,
   (B) dissolved anti-cratering agent which agent is poly-N-vinyl-5-methyl-2-oxazolidinone, and said resin and said agent being present in a weight proportion of about 98:2 to about 75:25, and
   (C) water in an amount to dissolve said resin and said agent and to impart the desired fluidity to said composition, said water containing dissolved alkaline agent selected from the class consisting of ammonia, alkyl amine, heterocyclicamine and alkanolamine, in an amount sufficient to bring said resin into aqueous solution and said composition having a pH of about 5–8.

2. The composition of claim 1 wherein said polycondensation reaction includes a modifier selected from the class consisting of alkane monocarboxylic acids having 6–13 carbon atoms and alkane monohydric alcohols having 4–13 carbon atoms.

3. The composition of claim 1 wherein said acid number is about 30–50.

4. The composition of claim 1 wherein said acidic member is trimellitic anhydride.

5. The composition of claim 1 wherein said acidic member is trimesic acid.

6. The composition of claim 1 wherein said dihydroxyl material is an alkylene glycol having 2–10 carbon atoms.

7. The composition of claim 6 wherein said glycol is neopentyl glycol.

8. The composition of claim 6 wherein said glycol is 1,4-butanediol.

9. The composition of claim 1 wherein said alkanedioic acid is adipic acid.

10. The composition of claim 1 wherein said alkenedioic acid is pimelic acid.

11. The composition of claim 1 wherein said proportion of said resin:agent is about 98:2 to 95:5.

12. A fluid composition suitable for use in the forming of a baked finish surface coating, which composition comprises:

(A) heat curable resin consisting essentially of a polyester resin which is the polycondensation reaction product of (a) an acidic member selected from the class consisting of trimellitic acid, trimellitic anhydride, hemimellitic acid, hemimellitic anhydride and trimesic acid, (b) an alkylene glycol having 2–10 carbon atoms, and (c) an alkanedioic acid having 4–10 carbon atoms, the reaction system containing acidic member/glycol/alkanedioic acid in a molar ratio in the range of 2.3–3.2/7/0.5–3.0, the carboxyl group affording reactants and hydroxyl group affording reactants being controlled to provide a molar ratio of hydroxyl groups/carboxyl groups charged to the reaction in the range of 1.05–1.50 and said polyester being characterized by an acid number of about 25–80;

(B) anti-cratering agent which agent is poly-N-vinyl-5-methyl-2-oxazolidinone and said resin and said agent being present, by weight, to make 100 parts of resin:agent blend in a proportion ranging from 98:2 to 95:5, and (C) water in an amount to dissolve said resin and said agent and to form a fluid composition, said water containing dissolved alkaline agent selected from the class consisting of ammonia, alkyl amine, heterocyclicamine and alkanolamine, in an amount sufficient to bring said resin into aqueous solution and said composition having a pH of about 5–8.

13. The composition of claim 12 wherein said polyester includes a modifier selected from the class consisting of alkane monocarboxylic acids having 6–13 carbon atoms and alkane monohydric alcohols having 4–13 carbon atoms.

14. The composition of claim 13 wherein said alcohol is isobutyl alcohol.

15. The composition of claim 13 wherein said monocarboxylic acid is pelargonic acid.

16. The composition of claim 12 wherein the acid number of said polyester is about 30–50.

No references cited.

MURRAY TILLMAN, *Primary Examiner.*

LEON J. BERCOVITZ, *Examiner.*